G. W. STOUT.
CORD SAVER AND FASTENER.
APPLICATION FILED FEB. 13, 1918.
1,413,626.
Patented Apr. 25, 1922.
2 SHEETS—SHEET 1.
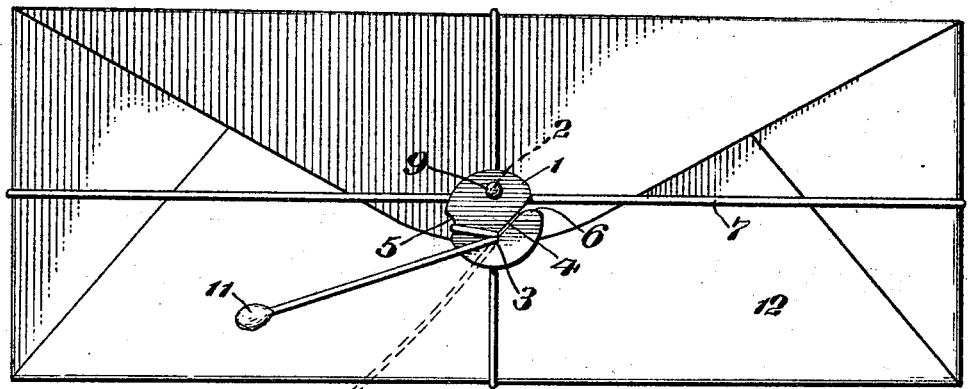
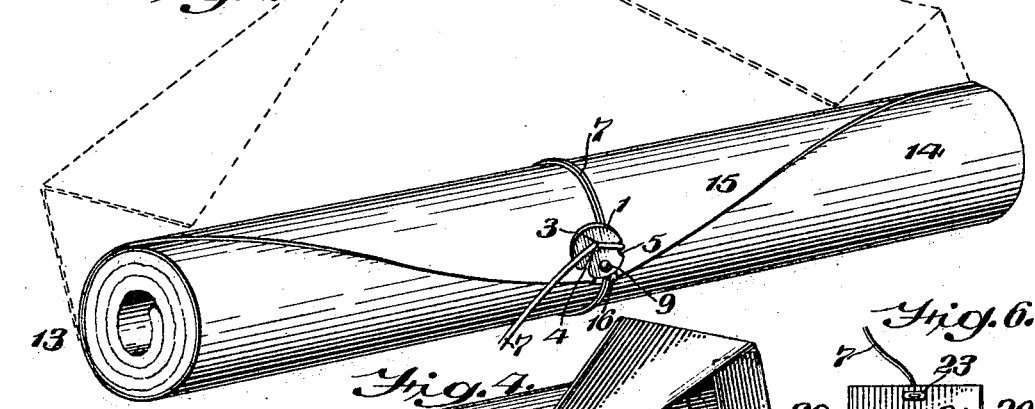
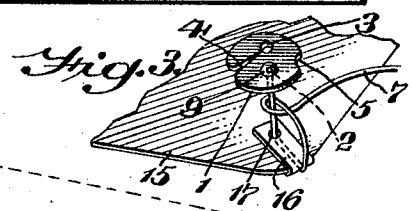
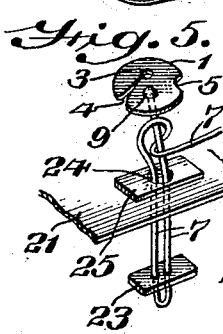
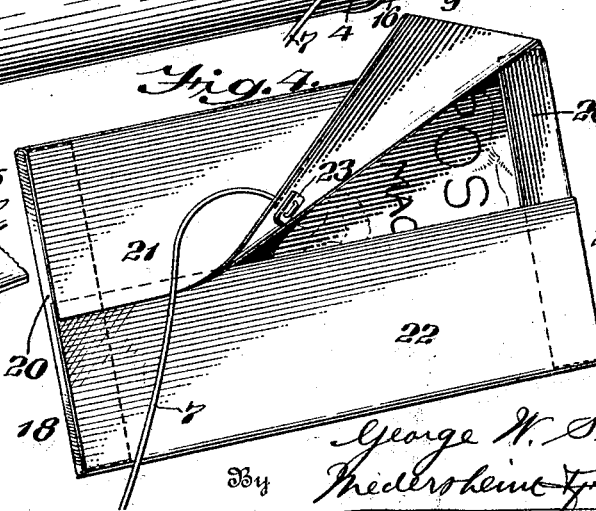
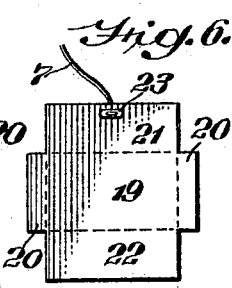
Inventor
George W. Stout,
By Medersheim & Fairbanks
Attorneys G. W. STOUT.
CORD SAVER AND FASTENER.
APPLICATION FILED FEB. 13, 1918.
1,413,626.
Patented Apr. 25, 1922.
2 SHEETS—SHEET 2.
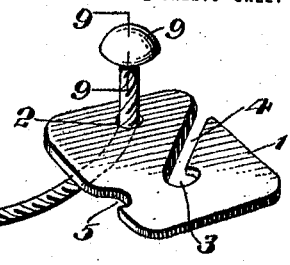
Fig. 7.
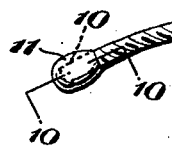
Fig. 10.
ON LINE 10-10, FIG. 7.
Fig. 9.
ON LINE 9-9, FIG. 7.
Fig. 11.
Fig. 12.
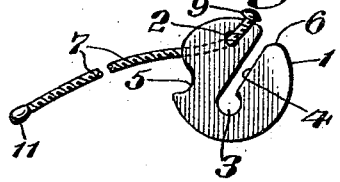
Fig. 8.
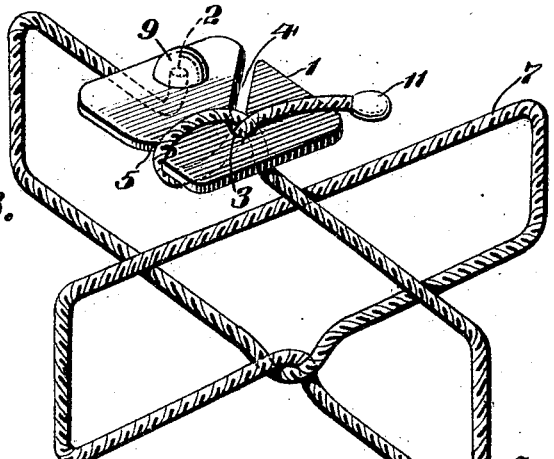
Inventor
George W. Stout,
By Thedes Shein Fairbanks,
Attorneys

UNITED STATES PATENT OFFICE.

GEORGE W. STOUT, OF MERCHANTVILLE, NEW JERSEY.

CORD SAVER AND FASTENER.

1,413,626.    Specification of Letters Patent.    Patented Apr. 25, 1922.

Application filed February 13, 1918. Serial No. 216,887.

*To all whom it may concern:*

Be it known that I, GEORGE W. STOUT, a citizen of the United States, residing at Merchantville, county of Camden, State of New Jersey, have invented a new and useful Cord Saver and Fastener, of which the following is a specification.

My invention consists of a novel construction of cord saver and fastener embodying a novel fastener or body composed of hard or vulcanized fibre or similar material having eyes on a line with a longitudinal median line, an oblique slot, slit, cut, opening or kerf extending from one of said eyes to one edge at the right of said body and the opposite edge thereof having a concave recess therein forming a shoulder to engage the fastening cord during the manipulation thereof.
It further consists of a novel construction of a fastener cord having a knot in one end treated with cement or the like to form a solid impervious head and the other terminal of said cord similarly treated, whereby a cord having solid impervious heads at each end which cannot fray out is produced for the purpose hereinafter explained.

It further consists of the combination of a fastening cord having the characteristics above recited with a fastener or body, whereby said body cannot become detached from said cord and the life of the latter is greatly prolonged.

For the purpose of illustrating my invention, I have shown in the accompanying drawing an embodiment which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a novel cord saver and fastener embodying my invention, showing the cord and fastener upon a sealed letter, each end of the cord being treated with sealing wax, the loose end thereof after being fastened being heated with a match and quickly sealed.

Figure 2 represents a perspective view of my invention showing also a magazine wrapped and fastened thereby.

Figure 3 represents a perspective view of the fastener showing also the manner of looping the fastening cord with respect thereto and the reinforcement of the eye for said cord.

Figure 4 represents a perspective view of a carton with fastener attached and the reinforcement for the eye in the flap thereof.

Figure 5 represents a perspective view of the fastener, the cord and reinforcing devices through which said cord passes.

Figure 6 represents a plan view of a blank and fastening cord connected to a flap thereof.

Figure 7 represents a perspective view of a fastener of slightly different exterior contour and a cord therefor having its knotted and opposite ends treated with cement or the like.

Figure 8 represents a diagrammatic, perspective view of the fastener and cord, seen in Figure 7, after adjustment.

Figure 9 represents a section on line 9—9 of Figure 7.

Figure 10 represents a section on line 10—10 of Figure 7.

Figures 11 and 12 represent plan views of other embodiments of my invention.

Similar numerals of reference indicate corresponding parts in the figures.

Referring to the drawings.

In all its embodiments my novel fastener comprises a body portion consisting preferably of a thin, small plate preferably of hard or vulcanized fibre or similar material having eyes and kerfs collocated in a novel and mechanical manner. The fastener is of comparatively wide major portion having at its top a cord receiving eye or eyelet of a size adjusted to the size of the cord used therein and at the lower end of its longitudinal median line there is preferably an enlarged eye or eyelet adjusted to carry from three to five strands of cord therein, with a slot, cut, opening or kerf extending at an acute angle from said enlarged eye or eyelet to the outer right hand edge of said body, said cut or kerf being of sufficient width to admit of the free action of the cord in the fastening and unfastening operation and the left-hand outer edge of said body is provided with a preferably concave indentation or recess forming a shoulder for the reception of the fastening cord on said left-hand outer edge, which shoulder is intermediate of said eyes or, if desired, slightly nearer the enlarged eye or the eye wherein said kerf terminates.

In the embodiment of my invention seen in Figure 1, 1 designates the plate or body of the fastener which is substantialy circular in its exterior contour and provided with the top eye or eyelet 2 and the slightly enlarged eye or eyelet 3 at the lower portion of the body on a longitudinal median line therethrough. 4 designates a cut or kerf extending at an acute angle from said eye 3 to the edge of the body and 5 designates a concave recess in the left-hand edge of said body at a point intermediate the eyes 2 and 3, the portion 6 of said body being rounded or convex if desired. All the embodiments of my invention seen in Figures 1, 2, 3, 5, 11 and 12 are substantially the same except that in Figure 1, I have shown the oblique cut or kerf 4 of minimum width, while in Figures 2, 3, 5 and 12, the oblique cut, kerf or opening 4 has its walls diverging outwardly.

In Figure 11, I have shown the oblique opening 4 in the form of a well defined slot having its walls substantially parallel, while in Figures 7 and 8, I have also shown said oblique cut 4 in the form of a slot having parallel walls, while the outer contour of the fastener or body is shown as being rectangular or polygonal.

7 designates the fastening cord which in all its embodiments preferably consists of a solid braided, cotton or other cord having at one end the knot 8, which is covered with cement or similar material, as will be understood from Figure 9, thereby forming a solid, impervious head, which cannot become frayed or pulled through the eye 2. The cord after having been drawn through the eye 2 has its outer terminal as 10 also treated with cement or the like as will be understood from Figure 10, whereby a solid impervious head 11 is formed, as will be understood from Figures 1, 7, 8 and 10. In Figure 1, I have shown the heads 9 and 11 as formed from sealing wax, whereby the head or terminal 11 can be readily sealed by applying heat thereto.

The advantage and utility of this appliance in this connection is that notwithstanding its simplicity, it forms a safeguard against loss or detachment of the fastening cord from the fastener body and in addition it prevents the knot from ever being untied and furthermore prevents fraying of the ends, thereby adding very considerably to the life of the fastening cord, and it cannot be entirely withdrawn from the fastener body in either direction.

My invention is equally applicable for use upon a square or rectangular package 12, as seen in Figure 1, or a rolled or cylindrical package 13 seen in Figure 2. The wrapper 14 of the latter figure may have its flap 15 reinforced as at 16 where the eyelet 17 is located through which the cord 7 passes as will be understood from Figures 2 and 3.

In the constructions seen in Figures 4 to 6, the wrapper, package or carton 18 may be constructed from a blank 19 having the end flaps 20 and the top and bottom flaps 21 and 22. The cord 7 is looped through the reinforcing strip 23 and passes thence through the flap 21 and the eye 24 of the reinforce 25, see Figure 5, the construction and manner of tying being apparent from Figure 5.

The manner of effecting the fastening and unfastening operations will be evident to those skilled in the art and it will be seen that my device lends itself to various manipulations of the fastening cord, one of the simplest forms being in Figure 8 and other steps in the manipulation of the fastening cord being seen from Figures 3 and 5. One preferred manner of using my invention is as follows:—

*To fasten.*

After wrapping cord, once each way around the article desired, carry loose end of the cord up into the deep opening 4, draw it sufficiently taut, then down into the shoulder at 5, underneath the fastener at your right, on around and up into the opening 4, snapping the cord behind the one therein.

*To unfasten.*

Place thumb of left hand on top of the knot, drop cord into the opening 4, then give a slight quick jerk, and the cord will instantly be released.

By the provision of the shoulder or recess 5 at the left-hand outer upper edge of the body at the proper angle from the eyelet 3, I am enabled upon the manipulation of the cord as above described to give a half hitch around the wide major portion of the body, thereby enabling the cord to become automatically locked or fastened in said eyelet 3.

It will now be apparent that I have devised a novel and useful construction of cord saver and fastener which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

A cord fastener, consisting of a body of curved exterior contour, having eyes 2 and 3 therein in line with the longitudinal median line of said body, a cut 4 extending from said eye 3 in an oblique line to the edge of said body, the distance between the walls of said cut being less than the diameter of said eye, and a curved recess 5 located in the edge of said body, opposite to said cut and intermediately of said eyes.

GEORGE W. STOUT.

Witnesses:
 GEO. J. PITMAN,
 ARTHUR E. CRAIG.